(12) United States Patent
Kolesnikov et al.

(10) Patent No.: US 9,361,480 B2
(45) Date of Patent: Jun. 7, 2016

(54) ANONYMIZATION OF STREAMING DATA

(71) Applicant: Alcatel-Lucent USA Inc., Murray Hill, NJ (US)

(72) Inventors: Vladimir Y. Kolesnikov, Jersey City, NJ (US); Gordon T. Wilfong, Florham Park, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/225,720

(22) Filed: Mar. 26, 2014

(65) Prior Publication Data
US 2015/0278549 A1   Oct. 1, 2015

(51) Int. Cl.
*H04L 29/06* (2006.01)
*G06F 21/62* (2013.01)
*H04L 9/00* (2006.01)

(52) U.S. Cl.
CPC .............. *G06F 21/6254* (2013.01); *H04L 9/00* (2013.01); *H04L 65/60* (2013.01); *H04L 2209/42* (2013.01)

(58) Field of Classification Search
CPC .................................................. G06F 21/6254
See application file for complete search history.

(56) References Cited

U.S. PATENT DOCUMENTS

| 7,861,096 B2* | 12/2010 | Staddon et al. ............... 713/193 |
| 8,627,488 B2* | 1/2014 | Cormode ................ G06F 21/10 713/189 |
| 2007/0061393 A1* | 3/2007 | Moore ................ G06F 17/3089 709/201 |

(Continued)

FOREIGN PATENT DOCUMENTS

| JP | 2014183547 A | * | 9/2014 |
| WO | 03/021473 | | 3/2003 |

OTHER PUBLICATIONS

George, Reenu Sara, and S. Sabitha. "Data anonymization and integrity checking in cloud computing." Computing, Communications and Networking Technologies (ICCCNT), 2013 Fourth International Conference on. IEEE, 2013.*

(Continued)

*Primary Examiner* — Shawnchoy Rahman
(74) *Attorney, Agent, or Firm* — Ryan, Mason & Lewis, LLP

(57) ABSTRACT

Techniques are provided for anonymizing streamed data. In various embodiments, data are anonymized by receiving a data element of a data stream including a plurality of said data elements ($p_i$, $s_i$), where $p_i$ comprises an identifying portion and $s_i$ comprises an associated sensitive information portion; obtaining a partitioned space S including t regions; assigning the identifying portion, $p_i$, to a selected region; encrypting the associated sensitive information $s_i$ as $e(s_i)$; and storing the encrypted associated sensitive information $e(s_i)$ in a list associated with the selected region but not storing the associated identifying portion, $p_i$, in the list. The regions have corresponding center points, and a nearest center to $p_i$ is optionally determined. The encrypted associated sensitive information $e(s_i)$ may be stored in a list associated with the nearest center.

22 Claims, 2 Drawing Sheets

(56) References Cited

U.S. PATENT DOCUMENTS

2008/0247677 A1* 10/2008 Yoshino .................. 382/305
2010/0191975 A1    7/2010 Chase et al.
2013/0227195 A1*  8/2013 Beaverson et al. .......... 711/103
2014/0019683 A1*  1/2014 Ishikawa .................. 711/114

OTHER PUBLICATIONS

Govinda, K., and Perla Ravitheja. "Identity anonymization and secure data storage using group signature in private cloud." Proceedings of the International Conference on Advances in Computing, Communications and Informatics. ACM, 2012.*

Gruteser et al., "Anonymous Usage of Location-Based Services Through Spatial and Temporal Cloaking", USENIX Association, MobiSys 2003: The First International Conference on Mobile Systems, Applications, and Services, pp. 1-13, (Jun. 26, 2003).

LaTanya Sweeney, "Computational Disclosure Control: A Primer on Data Privacy Protection", Internet Citation 2001, Retrieved from the Internet on Jan. 1, 2006: URL:http://www.swiss.ai.mit.edu/6805/articles/privacy/sweeney-thesis-draft.pdf.

* cited by examiner

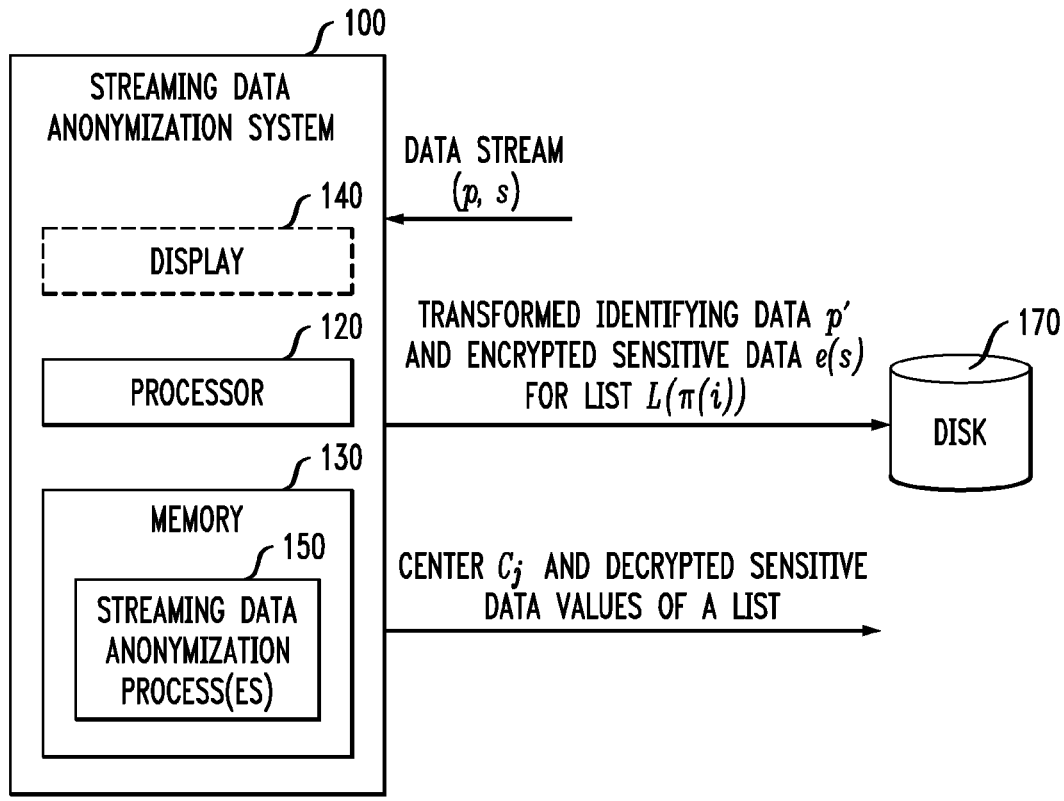

ANONYMIZATION OF STREAMING DATA

FIELD OF THE INVENTION

The present invention relates generally to techniques, apparatus and systems for anonymizing data.

BACKGROUND OF THE INVENTION

This section introduces aspects that may be helpful to facilitating a better understanding of the inventions. Accordingly, the statements of this section are to be read in this light and are not to be understood as admissions about what is in the prior art or what is not in the prior art.

It is often desirable to transform, pre-process and store a stream of sensitive data so that the transformed data can be analyzed without compromising the privacy of the data of any individual. Each data item in the streamed data typically comprises a first element identifying an individual, such as a name or an address, and a second element containing some private and/or sensitive information about the individual, such as a disease that the individual has. The identifying part of the data should be transformed so that the processed stream can be saved for later analysis in a manner that allows the data to be analyzed while maintaining the privacy of the individuals. Generally, researchers and/or analysts viewing the transformed data and associated sensitive data should be able to analyze the data and make reasonable (though approximate) conclusions about the data without being able to identify the sensitive information of any particular individual. For example, researchers may wish to study diseases in a particular neighborhood.

Data anonymization techniques can address the privacy concerns and aid compliance with applicable legal requirements. A number of data anonymization techniques have been proposed or suggested that achieve various privacy goals by ensuring that the transformed data has certain properties. For example, k-anonymity techniques require that each individual in the data set must be indistinguishable from k−1 other individuals. In addition, l-diversity techniques provide sufficient diversity in the sensitive information associated with individuals.

A need remains for improved techniques for effectively anonymizing data so that portions of the data can be published and shared with others.

SUMMARY OF THE INVENTION

Generally, methods and apparatus are provided for anonymizing data in a data stream. According to one embodiment, data in a data stream is anonymized by receiving a data element ($p_i$, $s_i$) of the data stream, where $p_i$ comprises an identifying portion and $s_i$ comprises associated sensitive information portion; obtaining a partitioned space S including t regions; assigning the identifying portion, $p_i$, to a selected region; encrypting the associated sensitive information portion $s_i$ as $e(s_i)$; and storing the encrypted associated sensitive information portion $e(s_i)$ in a list associated with the selected region but not storing the associated identifying portion, $p_i$, in the list.

According to a further embodiment, a permutation function $\pi$ optionally randomizes the order that regions $S_1$, $S_2$, ..., $S_t$ in the partitioned space S are stored so that an adversary cannot obtain information by observing the data being stored in particular regions. Thus, the list associated with the region $S_j$ is optionally mapped to a storage location using one or more of a permutation function and a hash table.

In one example embodiment, the space S is partitioned into regions $S_1$, $S_2$, ..., $S_t$, having corresponding center points $C_1$, $C_2$, ..., $C_t$ and a nearest center $C_j$ is computed to $p_i$; and the encrypted associated sensitive information $e(s_i)$ is stored in a list associated with the computed nearest center $C_j$. Another embodiment provides a user-specified distance parameter d, such that for a fixed distance d there are enough center points $C_1$, $C_2$, ..., $C_t$ so that for any point p in S there is some center $C_j$ so that p is at most distance d to $C_j$. The distance d is generally a limit on how different transformed identifying information must be from the identifying portion for each data element.

A more complete understanding of the present disclosure, as well as further features and advantages of various embodiments, will be obtained by reference to the following detailed description and drawings.

BRIEF DESCRIPTION OF THE DRAWINGS

FIG. 1 is a block diagram of an example streaming data anonymization system that can implement the processes of various embodiments;

FIG. 2 illustrates an example space S, corresponding to an example geographic area, partitioned into a plurality of example regions $S_1$, $S_2$, ..., $S_t$, each having a corresponding center $C_1$, $C_2$, ..., $C_t$.

DETAILED DESCRIPTION

Figure 3:
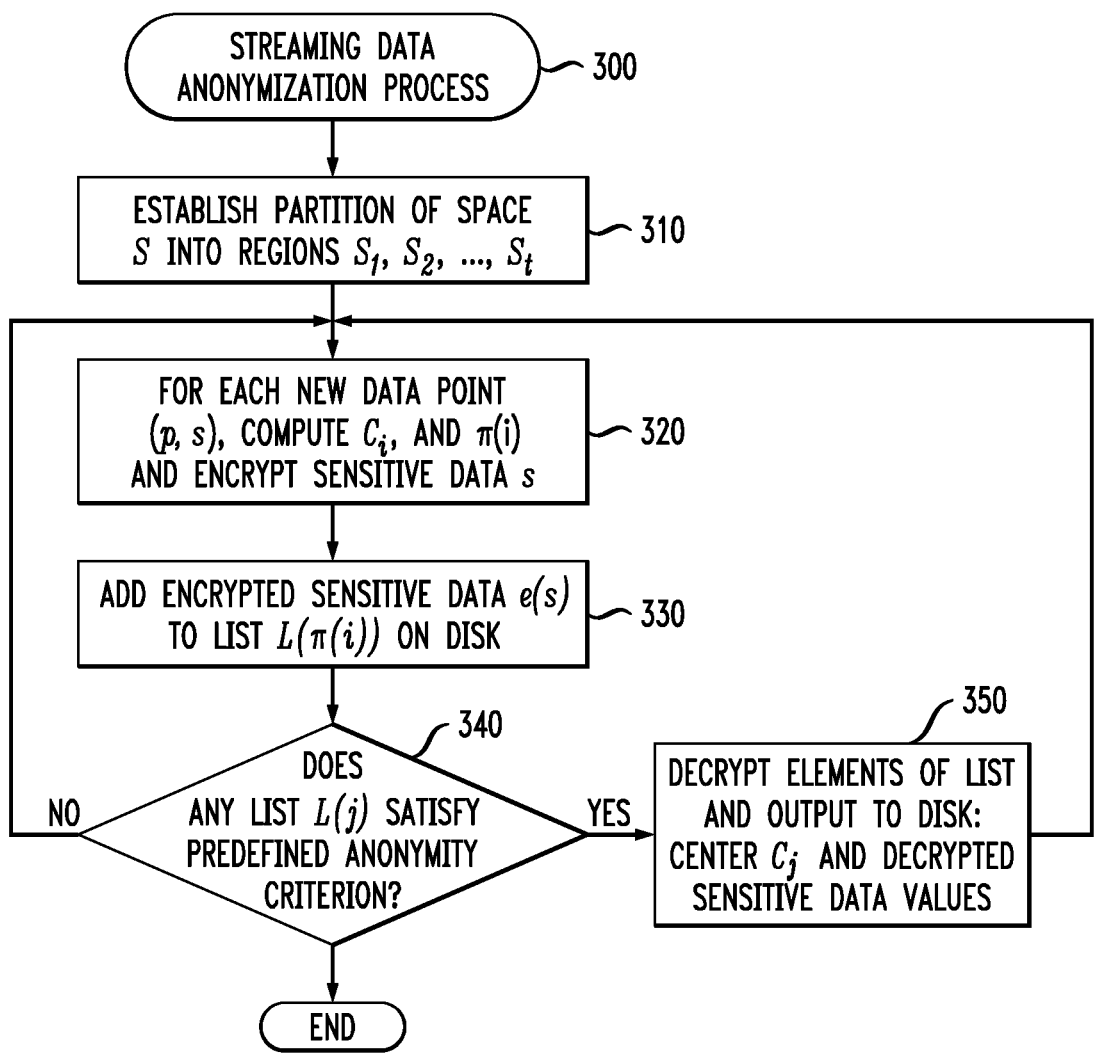
FIG. 3 is a flow chart illustrating an example implementation of a streaming data anonymization process incorporating aspects of the present invention.

Embodiments described herein provide methods, apparatus and systems for anonymizing streaming data. FIG. 1 illustrates an example streaming data anonymization system 100, e.g. a computer system, that can implement embodiments of processes within the scope of the disclosure. The example system 100 processes a data stream comprising sensitive data in accordance with various embodiments. Each data item (p, s) in the streamed data typically comprises a first element p identifying an individual, such as an address, and a second element s containing some private and/or sensitive information about the individual, such as a disease that the individual has. Various embodiments reflect the recognition that that unprotected sensitive data should not be written to disk even temporarily, because it is technically more challenging to ensure the protection of data. Importantly, this may be a legal requirement for a number of important applications.

As shown in FIG. 1, memory 130 configures the processor 120 to implement the streaming data anonymization methods, steps, and functions disclosed herein (collectively, shown as 150 in FIG. 1, and discussed further below in conjunction with FIG. 3). The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of system 100 can be incorporated into a personal computer, laptop computer, handheld computing device, application-specific circuit or general-use integrated circuit.

Consider the case where the transformed identifying data p' along with the associated sensitive data s can only be stored or transmitted when it is written as part of a set of such data all of which have the same transformed identifying part p' and with the property that no individual's sensitive data s can be determined (e.g., so-called k-anonymity requirement). This goal can be accomplished with the constraint that there is a fixed sized RAM buffer into which untransformed data (p, s) can be stored. According to a further embodiment, a limit is optionally specified on how different the transformed identifying information p' must be from each individual's true identifying data p. In this manner, the approximate transformed data (p', s) can be a good representation of the true data (p, s).

As discussed hereinafter, the example embodiment uses a combination of semantically secure encryption, a (randomly chosen) permutation function, $\pi$, or a hash table and a clustering heuristic. Various embodiments reflect the recognition that that intermediate sensitive data can be stored on a storage device, such as a storage disk, flash memory device or a network storage device, or transmitted over a network, as long as this intermediate sensitive data are encrypted. The example system 100 employs a disk space on one or more storage disks 170 as a secure extension of the RAM to store the transformed identifying data p' and encrypted sensitive data e(s) on a particular list $L(\pi(i))$ associated with a particular sub-region $S_i$ in a partitioned space S, as discussed further below in conjunction with FIG. 3.

Once a particular list, such as list L(j), satisfies a predefined anonymity criterion (e.g., the list has at least k elements), then the elements of the list are decrypted and the following values are output to the disk 170 (or another storage or transmission device) in an example embodiment: the center $C_j$ of the list and the decrypted sensitive data values from the list, as discussed further below in conjunction with FIG. 3. In other variations, any identifier of the list or region can be provided.

While the example embodiment is illustrated herein by finding a nearest center $C_j$ of a region in the partitioned space S, any partitioning into regions can be employed, as would be apparent to a person of ordinary skill in the art. In another example variation, the space 5, can be partitioned into a grid, and when untransformed data (p, s) enters the system 100, the data can be classified into a particular region $S_i$ of the space S, for example, based on the x and y range of the grid cell.

The example embodiment assumes that the identifying part of the data p comes from a space where distance is defined, such as the Euclidean space. Thus, for example, the data could be location data or any other tuples where each component of the tuple has a distance measure (since then the distance between tuples could be defined by any multidimensional metric such as $L_1$, $L_2$ (Euclidian metric), ..., or L-infinity). Let S denote the space of all possible identification data.

As indicated above, it is often desirable to transform, preprocess and stare a stream of sensitive data so that the transformed data (p', s) can be analyzed without compromising the privacy of the data of any individual. Generally, researchers and/or analysts viewing the transformed identifying data p' and associated sensitive data s should be able to study the data s and make reasonable (though approximate) conclusions about the data s without being able to identify the sensitive information p of any particular individual. For example, researchers may wish to study diseases in a particular neighborhood.

Some embodiments encrypt the sensitive data s before it is written to a disk, such as the example disk 170. Further embodiments partition a space S into a plurality of regions $S_1$, $S_2$, ..., $S_t$ so that all of the points in a particular region $S_i$ are at least as close to a center $C_i$ of the region $S_i$ as to any other center. FIG. 2 illustrates an example space S 200, corresponding to an example geographic area, partitioned into a plurality of example square regions $S_1$, $S_2$, ..., $S_t$ (t is equal to 9 in the example embodiment of FIG. 2) each having a corresponding center $C_1$, $C_2$, ..., $C_t$. The identifying part p of each data item (p, s) in the example embodiment of FIG. 2 corresponds to an address and the sensitive data s corresponds to a disease that the individual has.

In the example embodiment of FIG. 2, each square region $S_i$ corresponds to a different sub-region of a geographic area S 200. As each data item (p, s) in the streamed data is processed, the address corresponding to element p is used to classify the data item (p, s) into a particular sub-region $S_1$, $S_2$, ..., $S_t$ in which the address is located. An encrypted version e(s) of the sensitive data s is stored on disk in the appropriate sub-region. As discussed hereinafter, when the number of transformed data items in a given sub-region $S_i$ exceeds a specified threshold, the data items in the sub-region $S_i$ are decrypted and the decrypted sensitive data values can be output for further research and/or analysis.

FIG. 3 is a flow chart illustrating an example implementation of a streaming data anonymization process 300 consistent with various embodiments. As shown in FIG. 3, the example streaming data anonymization process 300 initially chooses a number of points $C_1$, $C_2$, ..., $C_t$ (called centers) in a space S and establishes a partition of the space S into regions $S_1$, $S_2$, ..., $S_t$ during step 310 so that all the points in a region $S_i$ are at least as close to C, as to any other center (i.e., a Voronoi diagram). For a fixed distance d, which can be an adjustable parameter, sufficiently many well-placed centers are selected so that for any point p in S there is some center $C_j$ so that p is at most distance d to $C_i$ (e.g., a sufficiently fine grid).

Consider a data point (p, s) of the stream where p is the identifying part of the data, and s is the associated sensitive information. Then, when (p, s) enters the system 100, the nearest center $C_i$, to p is computed during step 320, as well as the value $\pi(i)$, where $\pi$ is a randomly chosen permutation function on [1, t]. On the disk 170, t laists L(1), L(2), ..., L(t) of encrypted data are created as follows. The sensitive data s is encrypted as e(s) and e(s) is added to the list $L(\pi(i))$ on the disk 170 during step 330. The encryption can be any semantically secure encryption (i.e., an adversary cannot tell if two encryptions encrypt the same value). An example of a semantically secure encryption is Enc_k(x)=AES_k(x, r), where r is a randomly chosen value.

Generally, the permutation function it randomizes the order that the regions are stored $S_1$, $S_2$, ..., $S_t$ so that an adversary cannot obtain information by observing the data being stored in particular regions. In other words, the permutation function it maps the centers $C_i$ to disk locations.

In this manner, an adversary cannot inject data into the stream, monitor the portion of the disk that gets updated and thereby learn which part of the disk contains data about that particular region. In addition, timing attacks are optionally mitigated by adding/deleting dummy data points to keep all regions growing/shrinking randomly so an adversary cannot determine where real data are going or being written from.

The permutation function may be embodied as any randomly chosen permutation function. For small sets of $S_i$, the permutation can be generated and stored in RAM by enumerating the entire map $\pi(1)$, $\pi(2)$, etc. For larger sets, only the key needs to be stored and the mapping can be generated from the stored key. For a discussion of example techniques for generating a pseudorandom permutation on arbitrary size domain, see, for example, Ben Morris and Phillip Rogaway, "Sometimes-Recurse Shuffle: Almost-Random Permutations in Logarithmic Expected Time," (unpublished manuscript, August 2013), see, for example, http://eprint.iacr.org/2013/560.pdf).

A hash table implementation can employ standard hash table data structures, such as Cuckoo hashes. See, for example, Rasmus Pagh, et al., "Cuckoo Hashing," *Algorithms*—ESA 2001, Lecture Notes in Computer Science 2161, pp. 121-133 (2001).

Finally, if at any time it is detected during step 340 that one of the lists, such as list L(j), satisfies the predefined anonymity criterion that is employed (e.g., the list has at least k elements), then the elements of the list are decrypted and the following values are output to the disk 170 during step 350 (or transmitted over a network): the center $C_j$ of the list and the decrypted sensitive data values from the list.

In one example embodiment, the lists L(1), L(2), . . . , L(t) of encrypted data are optionally kept at an approximately equal size by adding dummy entries to one or more lists, deleting entries from one or more lists, as well as keeping some entries that have already been written out to disk. In this manner, any leaking of sensitive information using timing techniques is reduced.

The mapping of centers $C_i$ to disk locations via a permutation is efficient if the number of points $C_i$ is relatively small. In the case where there may be many such centers (e.g., more than disk storage locations), but not all of $C_i$ are populated, a hash table can be employed as an implementation of the disk location mapping of $C_i$. In general, the hash table may reveal $C_i$ from the disk address, so $C_i$ is deterministically encrypted before using it as a hash function key for locations. Deterministic encryption is needed as probabilistic encryption would not allow consistently allocating the same disk location for a specific $C_i$.

Finally, using a hash table as a mechanism for disk location allows easy update/re-randomization of the disk location used for storing the $C_1$ information. Indeed, simply encrypting $C_i$ concatenated with a counter allows the allocation of a new and unlinkable location for $C_i$ (current counter per ($C_i$) needs to be stored in RAM).

EXAMPLE

Consider a feed of data (p, s) where p contains the geographic endpoints of a communication (e.g., text message, phone call) and s is the type and duration of the communication. This stream of data comes into a computer (or computers) run by a service provider (SP). In many geographic areas, the SP is not legally allowed to record data points from this feed. That is, the SP cannot write (p, s) to disk. The SP wishes to perform some analytic computation on the data, for example, to optimize network configuration, to build better pricing plans or to prevent churn. The computer has limited memory (i.e., limited buffer size). In various embodiments the SP can write to disk "anonymized" data to be used later for analytics. For example, the SP may print out a value representing the approximate location of k (or more) actual communication endpoint pairs along with the accompanying sensitive data about those k (or more) communicating pairs. Such sets of points could periodically be written to disk as the limited memory fills up.

A unique feature of the example method is that it allows a user to specify an upper bound on the approximation of the identifying data. That is, a user can say that whenever data such as $(p_1, s_1), (p_2, s_2), (p_k, s_k)$ is written to disk in the form $(C_i, s_1, s_2, \ldots, s_k)$ then the maximum distance between any $p_j$ and $C_i$ is some distance d. That is, the quality of the approximation can be specified by the user. Thus, among other benefits, the disclosed method allows the user to specify the degree of approximation it will allow.

Also, by carefully storing encrypted data on disk, the bounded size of the trusted buffer (i.e. of RAM) is no longer a limitation.

System and Article of Manufacture Details

While FIG. 3 shows an example sequence of steps, in various embodiments the sequence may be varied. Various permutations of the algorithm are contemplated as alternate embodiments.

While various embodiments of the present inventions have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present inventions can be embodied in the form of methods and apparatuses for practicing those methods. One or more aspects of the present inventions can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus configured according to one or more embodiments of the invention. When implemented on a general-purpose processor, the program code segments combine with the processor to provide a device that operates analogously to specific logic circuits. Embodiments can also be implemented in one or more of an integrated circuit, a digital signal processor, a microprocessor, and a micro-controller.

As is known in the art, the methods and apparatus discussed herein may be distributed as an article of manufacture that itself comprises a tangible computer readable recordable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network. The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

We claim:

1. A method, comprising:
  receiving a data element of a data stream including a plurality of said data elements $(p_i, s_i)$, where $p_i$ comprises an identifying portion of an $i^{th}$ data element and $s_i$ comprises an associated sensitive information portion of said $i^{th}$ data element;
  obtaining, by at least one processing device, a partitioned space S including t regions $S_1, S_2, \ldots, S_t$;
  assigning, by at least one processing device, said identifying portion, $p_i$, to a selected one of said regions;
  encrypting, by at least one processing device, said associated sensitive information portion $s_i$ as $e(s_i)$; and
  storing, by at least one processing device, said encrypted associated sensitive information portion $e(s_i)$ in a non-transitory electronic memory device in a list associated with said selected region but not storing said associated identifying portion, $p_i$, in said list after using said associated identifying portion, $p_i$, to assign said associated identifying portion, $p_i$, to said selected region.

2. The method of claim 1, further comprising the step of mapping said list associated with said selected region to a storage location of said memory device using one or more of a permutation function and a hash table.

3. The method of claim 2, wherein said permutation function comprises a randomly chosen permutation function on [1, t].

4. The method of claim 1, further comprising the steps of:
  obtaining a number of center points $C_1, C_2, \ldots, C_t$ corresponding to regions $S_1, S_2, \ldots, S_t$ in said partitioned space S; and
  computing a nearest center to $p_i$,
  wherein said list is associated with said computed nearest center.

5. The method of claim 4, wherein points in a region corresponding to said nearest center are at least as close to said nearest center as to any other of said center points.

6. The method of claim 4, where there are a number of said regions having corresponding center points $C_1, C_2, \ldots, C_t$ such that for any identifying portion p in said partitioned space S there is a region having a corresponding center point C so that p is at most a fixed distance d to said corresponding center point C.

7. The method of claim 6, wherein said fixed distance d is an adjustable parameter.

8. The method of claim 1, further comprising the step of outputting an identifier of a given list and decrypted sensitive data values from the given list on the condition that one or more predefined anonymity criterion are satisfied by said given list.

9. The method of claim 1, further comprising one or more of:
  adding dummy entries to one or more lists;
  deleting entries from one or more lists; and
  maintaining one or more entries in one or more lists that have been output.

10. A non-transitory machine-readable recordable storage medium for anonymizing data in a data stream, wherein one or more software programs when executed by one or more processing devices implement the steps of the method of claim 1.

11. A system, comprising:
  a memory; and
  at least one hardware processing device, coupled to the memory, operative to:
  receive a data element of a data stream including a plurality of said data elements $(p_i, s_i)$, where $p_i$ comprises an identifying portion of an data element and $s_i$ comprises an associated sensitive information portion of said $i^{th}$ data element;
  obtain, by at least one processing device, a partitioned space S including t regions $S_1, S_2, \ldots, S_t$;
  assign, by at least one processing device, said identifying portion, $p_i$, to a selected one of said regions;
  encrypt, by at least one processing device, said associated sensitive information portion $s_i$ as $e(s_i)$; and
  store, by at least one processing device, said encrypted associated sensitive information portion $e(s_i)$ in a non-transitory electronic memory device in a list associated with said selected region but not storing said associated identifying portion, $p_i$, in said list after using said associated identifying portion, $p_i$, to assign said associated identifying portion, $p_i$, to said selected region.

12. The system of claim 11, wherein said at least one hardware device is further configured to map said list associated with said selected region to a storage location of said memory device using one or more of a permutation function and a hash table.

13. The system of claim 12, wherein said permutation function comprises a randomly chosen permutation function on [1, t].

14. The system of claim 11, wherein said at least one hardware device is further configured to:
  obtain a number of center points $C_1, C_2, \ldots, C_t$ in said partitioned space S comprising regions $S_1, S_2, \ldots, S_t$; and
  compute a nearest center to $p_i$,
  wherein said list is associated with said computed nearest center.

15. The system of claim 14, wherein points in a region corresponding to said nearest center are at least as close to said nearest center as to any other of said center points.

16. The system of claim 14, where there are a number of said regions having corresponding center points $C_1, C_2, \ldots, C_t$ such that for any identifying portion p in said partitioned space S there is a region having a corresponding center point C so that p is at most a fixed distance d to said corresponding center point C.

17. The system of claim 11, wherein said at least one hardware device is further configured to output an identifier of a given list and decrypted sensitive data values from the given list on the condition that one or more predefined anonymity criterion are satisfied by said given list.

18. The system of claim 11, wherein said at least one hardware device is further configured to perform one or more of the following functions:
  add dummy entries to one or more lists;
  delete entries from one or more lists; and
  maintain one or more entries in one or more lists that have been output.

19. A method for configuring a processing system to operate as a streaming data anonymization system, comprising:
  configuring at least one processing system element to receive a data element of a data stream including a plurality of said data elements $(p_i, s_i)$, where $p_i$ comprises an identifying portion of an $i^{th}$ data element and $s_i$ comprises an associated sensitive information portion of said $i^{th}$ data element;

configuring at least one processing system element to obtain a partitioned space S including t regions $S_1, S_2, \ldots, S_t$;

configuring at least one processing system element to assign said identifying portion, $p_i$, to a selected one of said regions;

configuring at least one processing system element to encrypt said associated sensitive information portion $s_i$ as $e(s_i)$; and configuring at least one processing system element to store said encrypted associated sensitive information portion $e(s_i)$ in a non-transitory electronic memory device in a list associated with said selected region but not storing said associated identifying portion, $p_i$, in said list after using said associated identifying portion, $p_i$, to assign said associated identifying portion, $p_i$, to said selected region.

20. The method of claim 19, further comprising the step of configuring at least one processing system element to map said list associated with said selected region to a storage location of said memory device using one or more of a permutation function and a hash table.

21. The method of claim 19, further comprising the steps of:

configuring at least one processing system element to obtain a number of center points $C_1, C_2, \ldots, C_t$ corresponding to regions $S_1, S_2, \ldots, S_t$ in said partitioned space S; and configuring at least one processing system element to compute a nearest center to $p_i$, wherein said list is associated with said computed nearest center.

22. The method of claim 19, further comprising the step of configuring at least one processing system element to output an identifier of a given list and decrypted sensitive data values from the given list on the condition that one or more predefined anonymity criterion are satisfied by said given list.

* * * * *